United States Patent Office 3,780,071
Patented Dec. 18, 1973

3,780,071
PROCESS FOR THE MANUFACTURE OF 2,5-DIACYL AMINO-1,4-BENZOQUINONES
Stefan Hari, Allschwil, and Karl Ronco, Riehen, Switzerland, assignors to Ciba-Geigy AG, Basel, Switzerland
No Drawing. Filed June 9, 1971, Ser. No. 151,530
Claims priority, application Switzerland, June 11, 1970, 8,808/70
Int. Cl. C07c 103/02
U.S. Cl. 260—396 R      9 Claims

ABSTRACT OF THE DISCLOSURE

Process for the manufacture of 2,5-diacylamino-1,4-benzoquinones, especially 2,5 - dibenzoylamino-1,4-benzoquinones by acylation of 2,5-diamino-1,4-benzoquinones with carboxylic acid halides in the presence of a Friedel-Crafts catalyst.

---

It is known that 2,5-diaroylamino-3,6-dihalogeno-1,4-benzoquinones cannot be manufactured by direct acylation of 2,5-diamino-3,6-dihalogeno-1,4-benzoquinones (see Swiss patent specifications 473,775 and 475,945). In order to obtain these intermediate products, which are important for the synthesis of dioxazine dyestuffs, it has hitherto been necessary either to start from benzoquinone and utilise a multi-stage, involved process (see French patent specification 1,345,524) or, in accordance with the process of Swiss patent specification 473,775, to reduce the 2,5-diamino - 3,6 - dihalogeno-benzoquinones to the 2,5-diamino-3,6-dihalogeno-hydroquinones, acylate the latter, and re-oxidise the acylated hydroquinones to the quinones. The last-mentioned process, apart from requiring 3 stages, suffers from the disadvantage that the acylation only takes place in reasonably good yield if a large excess of acylating agent is used. This however has the consequence that the hydroxyl groups are also partially acylated, so that before oxidation to the quinone a partial hydrolysis is necessary.

It has now been found that 2,5-diacylamino-1,4-benzoquinones are obtained by direct acylation of 2,5-diaminobenzoquinones with carboxylic acid halides if the acylation is carried out in the presence of a Friedel-Crafts catalyst.

As starting substances for the process according to the invention, there may, for example, be mentioned 2,5-diamino-1,4-benzoquinone, and especially 2,5-diamino-3,6-dihalogeno-1,4-benzoquinones, such as, for example, 2,5-diamino-3,6-dichloro- or -dibromo-1,4-benzoquinone.

Suitable acylating agents are the halides, especially the chlorides, of aliphatic, cycloaliphatic, araliphatic, heterocyclic or preferably aromatic carboxylic acids, especially benzenecarboxylic acids of the formula

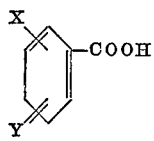

wherein X and Y denote H or halogen atoms, alkyl, phenyl, nitro, acetoxy, carbomethoxy and alkoxy or carboxyl groups.

As examples, there may be mentioned the chlorides of acetic acid, chloroacetic acid, propionic acid, chloropropionic acid, butyric acid, caproic acid, caprylic acid, 2-ethylcaproic acid, acrylic acid, methacrylic acid, crotonic acid, hexahydrobenzoic acid, phenylacetic acid, α- or β-phenylpropionic acid, α-phenylacrylic acid, cinnamic acid, pyridine - 3 - carboxylic acid, furane-2-carboxylic acid, thiophene - 2 - carboxylic acid, benzoic acid, o-, p- or m-chlorobenzoic acid, 2,4-dichlorobenzoic acid, o-, m- or p-methylbenzoic acid, p-nitrobenzoic acid, diphenyl-4-carboxylic acid, and α- or β-naphthoic acid.

It is advisable to use an excess over the theoretically required amount of 2 mols of the acylating agent per 1 mol of the diamonbenzoquinone. Particularly good results are achieved with 2.4 to 3 mols of the carboxylic acid halide per 1 mol of the diamine.

To activate the acylation, Friedel-Crafts catalysts, which can chemically be described as strongly electrophilic metal halides, are used. As examples, there may be mentioned: tin tetrachloride, zinc chloride, antimony pentafluoride, titanium tetrachloride and especially the aluminum halides, such as aluminium chloride and aluminium bromide. Preferably, at least 3 mols of aluminium chloride are used per 1 mol of the diaminobenzoquinone. The use of more than 4 mols of aluminium chloride as a rule serves no purpose, since no significant increase in the yield can thereby be achieved.

The acylation is appropriately carried out in an inert organic solvent, such as is generally customary in Friedel-Crafts reactions, for example in tetrahydrothiophene-1,1-dioxide, nitromethane, methylene chloride, ethylene dichloride, carbon tetrachloride or dichlorobenzene, and especially nitrobenzene.

The reaction temperature is appropriately between 20 to 100° C., especially between 50 to 80° C.

The resulting diacylaminobenzoquinones are appropriately isolated by introducing the reaction mixture into water, dilute hydrochloric acid, ice or alcohol, if necessary with external cooling. The diacyl compound which thereupon precipitates can be isolated by filtering off. It is obtained in good yield and purity.

The process according to the invention also represents an advance as regards the manufacture of 2,5-dialkanoyl-amino-3,6-dihalogenobenzoquinones, since the latter are obtained in better yield and in higher purity than according to the process hitherto known.

In the example which follows, the parts unless otherwise stated, denote parts by weight, and the percentages denote percentages by weight.

EXAMPLE 1

5.1 parts of 2,5-diamino-3,6-dichlorobenzoquinone and 13.3 parts of anhydrous aluminium chloride are stirred with 30 parts by volume of nitrobenzene, in the course of which the temperature rises to 58° C. 19 parts by volume of benzoyl chloride are added over the course of 3 minutes and the mixture is stirred for 55 minutes at 57° C. In the course thereof, a vigorous evolution of hydrochloric acid is observed. Yellow crystals precipitate from the black-coloured solution. The reaction mixture is thereafter poured into 60 parts by volume of alcohol, with external cooling. The resulting sludge is filtered off at 15° C., and the product is washed with alcohol and water until colourless and is dried in vacuo at 65° C. The yield of 2,5-dibenzoylamino-3,6-dichlorobenzoquinone is 7.95 parts or 77% of theory. The product, which consists of uniform yellow needles, melts at 261 to 262° C., with decomposition. The IR spectrum of the product is identical with the IR spectrum of the product described in French Pat. 1,508,017.

If the reaction is carried out in the presence of only 10 parts of anhydrous aluminium chloride, the yield of 2,5-dibenzoylamino-3,6-dichlorobenzoqinone is 7.4 parts or 71% of theory. The product then melts at 268 to 260° C., with decomposition.

Further 2,5-diacylamino-3,6-dichlorobenzoquinones are obtained if 2,5-diamino-3,6-dichlorobenzoquinone is acylated with the acid chlorides listed in Column I, in accordance with the instructions of this example.

| I | | Reaction Temperature, °C. | Time in hours | Yield in percent | Melting point or decomposition point, °C. |
|---|---|---|---|---|---|
| 1 | Acetyl chloride | 40 | 0.3 | 77 | 254 |
| 2 | Cinnamyl chloride | 60 | 0.5 | 75 | 266 |
| 3 | o-Chlorobenzoyl chloride | 57 | 1.3 | 78 | 270–271 |
| 4 | o-Methoxybenzoyl chloride | 57 | 1.15 | 75 | 237–239 |
| 5 | o-Toluyl chloride | 56 | 0.5 | 72 | 270–272 |
| 6 | o-Fluorobenzoyl chloride | 57 | 1 | 73 | 216–217 |

EXAMPLE 2

5.1 parts of 2,5-diamino-3,6-dichlorobenzoquinone are benzoylated in accordance with Example 1. The reaction mixture is thereafter poured into 100 parts by volume of 1 N hydrochloric acid solution, and the resulting sticky precipitate is filtered off, heated to 60° C. in 60 parts by volume of alcohol, cooled to 10° C., filtered off and dried in vacuo at 65° C. The yield is 8.3 parts or 80% of theory. The substance melts at 264 to 265° C., with decomposition.

EXAMPLE 3

5.1 parts of 2,5-diamino-3,6-dichlorobenzoquinone and 13.3 parts of anhydrous aluminium chloride are stirred with 30 parts by volume of nitrobenzene, in the course of which the temperature rises to 58° C. The mixture is cooled to 45° C., 21.2 parts by volume of phenylacetyl chloride are added over the course of 5 minutes, and the whole is stirred for 1 hour at 45° C. In the course thereof, vigorous evolution of hydrochloric acid is observed. The brown reaction mixture is poured into 80 parts by volume of alcohol cooled to 5° C., whilst cooling externally. The resulting sludge is filtered off at 15° C. and the product is washed with alcohol and water until colourless and is dried in vacuo at 65° C. The yield of 2,5-diphenacetyl-amino-3,6-dichlorobenzoquinone is 11.1 parts or 100% of theory. The product, consisting of yellow flakes, melts at 231 to 232° C., with decomposition. If 2 parts of the product are recrystallised from 240 parts by volume of glacial acetic acid-dimethylformamide (2:1), the melting point rises to 251° C.

*Analysis.*—Found: C, 59.8; H, 3.8; N, 6.3; Cl, 15.6%. Calculated: C, 59.61; H, 3.64; N, 6.32; Cl, 16.00%.

EXAMPLE 4

5.1 parts of 2,5-diamino-3,6-dichlorobenzoquinone and 13.3 parts of anhydrous aluminium chloride are stirred with 30 parts by volume of nitrobenzene, in the course of which the temperature rises to 58° C. 13.2 parts by volume of o-chlorobenzoyl chloride are added over the course of 3 minutes, and the mixture is stirred for 7 hours at 57° C. Thereafter the reaction mixture is poured into 60 parts by volume of alcohol, whilst cooling externally. The temperature rises to 60° C. notwithstanding the external cooling. The resulting sludge is finally filtered off at 15° C. and the product is washed with alcohol and water until colourless and is dried in vacuo at 65° C. 9.6 parts (80% of theory) of a light yellow powder of melting point 259–260° C. (with decomposition) are obtained. The IR spectrum of the 2,5-di(2'-chlorobenzoyl-amino)-3,6-dichlorobenzoquinone thus produced is identical with the IR spectrum of the product described in French Pat. 1,508,017. The following quinone derivatives of the general formula

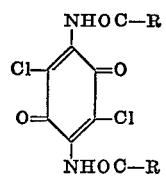

can be prepared analogously by reaction of 2,5-diamino-3,6-dichlorobenzoquinone with carboxylic acid chlorides:

| No. | R | Amount of acid chloride in mols | Reaction Temperature, °C. | Time in hours | Melting point or decomposition point, °C. |
|---|---|---|---|---|---|
| 1 | $C_6H_5$ | 0.12 | 56 | 1.2 | 260–261 |
| 2 | $o\text{-}ClC_6H_4$ | 0.06 | 56 | 9 | 260–262 |
| 3 | $p\text{-}ClC_6H_4$ | 0.16 | 56 | 6 | >300 |
| 4 | $CH_2=CH$ | 0.16 | 75 | 1 | 237–237 |
| 5 | $CH_3CH=CH$ | 0.16 | 75 | 1 | 234–236 |
| 6 | 2-thienyl | 0.16 | 57 | 1¼ | 273–274 |
| 7 | $p\text{-}C(CH_3)_3C_6H_4$ | 0.14 | 55 | 3 | 255–256 |
| 8 | 1-naphthyl | 0.10 | 55 | ¾ | 271–273 |
| 9 | $p\text{-}CH_3OC_6H_4$ | 0.14 | 57 | 1 | 258–259 |
| 10 | $p\text{-}CH_3C_6H_4$ | 0.16 | 55 | 1 | 293–295 |
| 11 | $p\text{-}NO_2C_6H_4$ | 0.16 | 56 | 1 | 261 |
| 12 | $p\text{-}C_6H_5C_6H_4$ | 0.16 | 58 | 2 | 303–305 |
| 13 | $o\text{-}CH_3COOC_6H_4$ | 0.16 | 56 | ¼ | 248–250 |
| 14 | $p\text{-}HOOCC_6H_4$ | 0.16 | 60 | 5 | >310 |
| 15 | $p\text{-}CH_3OOCC_6H_4$ | 0.16 | 156 | 3 | >310 |

EXAMPLE 5

5.1 parts of 2,5-diamino-3,6-dichlorobenzoquinone and 10 parts of anhydrous aluminium chloride are stirred with 30 parts by volume of nitrobenzene, in the course of which the temperature rises to 52° C. 5.7 parts by volume of acetyl chloride are added over the course of 2 minutes and the mixture is stirred for 2¼ hours at 56° C. Thereafter the reaction mixture is poured into 60 parts by volume of alcohol, with external cooling. The resulting sludge is filtered off at 10° C. and the product is washed with alcohol and water until colourless and is dried in vacuo at 65° C. The yield of 2,5-diacetylamino-3,6-dichlorobenzoquinone is 5.8 parts or 80% of theory. The product, consisting of uniform yellow needles, melts at 254° C. with decomposition.

2,5-diacetylamino-1,4-benzoquinone is obtained if, in place of 2,5-diamino-3,6-dichlorobenzoquinone, 3.5 parts of 2,5-diamino-1,4-benzoquinone are used in this example. 2,5-diacetylamino-1,4-benzoquinone is an intensely yellow powder which melts at 294° C., with decomposition.

EXAMPLE 6

20.7 parts of 2,5-diamino-3,6-dichlorobenzoquinone and 53.2 parts of anhydrous aluminium chloride are stirred with 120 parts by volume of nitrobenzene and 64.8 parts by volume of 2,4-dichlorobenzoyl chloride are added all at once. The reaction mixture is stirred for 10 hours at 56° C. and is left to stand for 16 hours and poured into 240 parts by volume of alcohol. The resulting sludge is filtered off at 15° C. and the product is washed with alcohol and water until colourless and is dried in vacuo at 65° C. 2,5-di-(2',4'-dichlorobenzoylamino)-3,6-dichlorobenzoquinone is obtained as a yellow powder of melting point 277–278° C., in a yield of 41.1 parts, corresponding to 74% of theory.

EXAMPLE 7

5.1 parts of 2,5-diamino-3,6-dichlorobenzoquinone and 13.3 parts of anhydrous aluminum chloride are stirred with 30 parts by volume of methylene chloride. 19 parts by volume of benzoyl chloride are added over the course of 3 minutes and the mixture is stirred for 6 hours at 50° C. Thereafter the reaction mixture is worked up analogously to Example 1, 6.9 parts (67% of theory) of 2,5-dibenzoylamino 3,6-dichlorobenzoquinone are obtained as a yellow powder of melting point 260 to 261° C., with decomposition.

EXAMPLE 8

207 parts of 2,5-diamino-3,6-dichlorobenzoquinone and 532 parts of anhydrous aluminium chloride are stirred with 1200 parts by volume of nitrobenzene, in the course of which the temperature rises to 66° C. 420 parts by volume of 2-chlorobenzoyl chloride are added over the course of 5 minutes, whereupon the temperature drops to 62° C.; the mixture is cooled to 56° C. and is thereafter vigorously stirred for 8 hours at this temperature. In the course thereof, a strong evolution of hydrochloric acid is observed. The black reaction mixture is left to stand for 14 hours without application of heat, and is poured, whilst stirring, into 2400 parts by volume of alcohol cooled to 5° C. In spite of external cooling with icewater, the temperature rises to 72° C. The resulting sludge is cooled to 15° C. and filtered off at this temperature, and the product is washed with 2000 parts by volume of alcohol and with 4000 parts by volume of water at 70° C. After drying, 393 parts of 2,5-di-(2'-chlorobenzoylamino)-3,6-dichlorobenzoquinone are obtained, that is to say 81% of theory, relative to 2,5-diamino-3,6-dichlorobenzoquinone. Melting point: 267–269° C., with decomposition. If the amount of the 2-chlorobenzoyl chloride used is reduced to 316 parts by volume (432 parts) and the mixture is instead stirred for 10 hours at 65° C., the yield of 2,5-di-(2'-chlorobenzoylamino) - 3,6 - dichlorobenzoquinone is 358 parts or 74% of theory. The product then melts at 262–263° C., with decomposition.

We claim:
1. Process for the manufacture of 2,5-diacylamino-3,6-dihalogeno-1,4-benzoquinones by direct acylation of 2,5-diamino - 3,6 - dihalogeno-1,4-benzoquinones with carboxylic acid halides, characterised in that the acylation is carried out in the presence of a Friedel-Crafts metal halide catalyst selected from the group consisting essentially of tin tetrachloride, zinc chloride, antimony pentafluoride, titanium tetrachloride, aluminum chloride or aluminum bromide at 20–100° C.

2. Process according to claim 1, characterized in that it starts from 2,5-diamino-3,6-dihalogeno-1,4-benzoquinones.

3. Process according to claim 2, characterised in that it starts from 2,5-diamino-3,6-dichlorobenzoquinone.

4. Process according to claim 1, characterised in that halides of the formula:

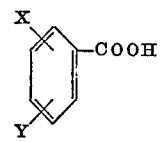

wherein X and Y are H, halogen, alkyl, phenyl, nitro, acetoxy, carbomethoxy, alkoxy or carboxyl groups are used as acylating agents.

5. Process according to claim 4, characterised in that benzoyl halides are used as acylating agents.

6. Process according to claim, 1 characterised in that aluminum chloride is used as the Friedel-Crafts catalyst.

7. Process according to claim 6, characterised in that at least 3 mols of aluminium chloride are used per 1 mol of the diaminobenzoquinone.

8. Process according to claim 1, characterised in that the acylation is carried out in an inert organic solvent.

9. Process according to claim 8, characterized in that nitrobenzene is used as the organic solvent.

References Cited

UNITED STATES PATENTS

| | | | |
|---|---|---|---|
| 3,128,301 | 4/1964 | Larsen et al. | 260—471 R |
| 3,210,408 | 10/1965 | Bauer | 260—491 |
| 3,370,069 | 2/1968 | Winkelmann et al. | 260—396 R |

OTHER REFERENCES

Wagner and Zook, Syn. Org. Chem., 1953, p. 566

VIVIAN GARNER, Primary Examiner

U.S.Cl. X.R.

260—295.5 A, 332.2 C, 347.3